United States Patent
Tell

(10) Patent No.: US 8,662,861 B2
(45) Date of Patent: Mar. 4, 2014

(54) EJECTOR DEVICE WITH VENTILATION ACTION

(75) Inventor: Peter Tell, Åkersberga (SE)

(73) Assignee: Xerex AB, Taby (SE)

(*) Notice: Subject to any disclaimer, the term of this patent is extended or adjusted under 35 U.S.C. 154(b) by 978 days.

(21) Appl. No.: 12/523,261

(22) PCT Filed: Jan. 9, 2008

(86) PCT No.: PCT/SE2008/050023
§ 371 (c)(1),
(2), (4) Date: Aug. 13, 2009

(87) PCT Pub. No.: WO2008/088280
PCT Pub. Date: Jul. 24, 2008

(65) Prior Publication Data
US 2010/0045057 A1      Feb. 25, 2010

(30) Foreign Application Priority Data
Jan. 16, 2007   (SE) .................................... 0700082

(51) Int. Cl.
*F04F 5/48*      (2006.01)
*B25J 15/06*     (2006.01)

(52) U.S. Cl.
USPC ........... 417/187; 417/182; 294/64.2; 294/189

(58) Field of Classification Search
USPC ......... 417/187, 151, 182, 184; 294/64.2, 189; 137/565.23; 414/627
See application file for complete search history.

(56) References Cited

U.S. PATENT DOCUMENTS

| | | | | |
|---|---|---|---|---|
| 3,716,307 A | * | 2/1973 | Hansen | 417/191 |
| 4,432,701 A | * | 2/1984 | Ise | 417/187 |
| 4,453,755 A | * | 6/1984 | Blatt et al. | 294/64.2 |
| 4,549,854 A | * | 10/1985 | Yamamoto | 417/187 |
| 4,600,230 A | * | 7/1986 | Ise | 294/64.2 |
| 4,655,692 A | * | 4/1987 | Ise | 417/187 |
| 4,750,768 A | * | 6/1988 | Kumar | 294/185 |

(Continued)

FOREIGN PATENT DOCUMENTS

GB     2 038 282     7/1980

OTHER PUBLICATIONS

International Search Report dated Apr. 9, 2008, from corresponding PCT application.

*Primary Examiner* — Charles Freay
*Assistant Examiner* — Alexander Comley
(74) *Attorney, Agent, or Firm* — Young & Thompson

(57) ABSTRACT

An ejector device adapted to generate a negative pressure with compressed air, which via a compressed-air duct is fed to an ejector, the device including a valve member arranged in the compressed-air duct and controllable in order to, in the open position, allow flow of compressed air to the ejector, an air suction duct arranged between the ejector and a gripping member driven by negative pressure, and a vent valve fluidly arranged with the air suction duct and that, in an open position, places the gripping member in communication with the atmosphere. The valve member embraces: a primary valve arranged in the direction of flow of compressed air; a secondary valve arranged downstream of the primary valve; a flow section of compressed-air duct between the primary and secondary valve, the vent valve communicating with the flow section so that, in the open position of the primary valve, is continuously being subjected to a closing air pressure, independently of the open or closed position of the secondary valve.

12 Claims, 3 Drawing Sheets

(56) References Cited

U.S. PATENT DOCUMENTS

| | | | |
|---|---|---|---|
| 4,828,306 A * | 5/1989 | Blatt | 294/64.2 |
| 4,865,521 A * | 9/1989 | Ise et al. | 417/187 |
| 4,950,016 A * | 8/1990 | Kumar | 294/64.2 |
| 5,007,803 A * | 4/1991 | DiVito et al. | 417/137 |
| 5,188,411 A * | 2/1993 | Golden | 294/64.2 |
| 5,201,560 A * | 4/1993 | Golden | 294/64.2 |
| 5,277,468 A * | 1/1994 | Blatt et al. | 294/64.2 |
| 5,683,227 A * | 11/1997 | Nagai et al. | 417/174 |
| 5,887,623 A * | 3/1999 | Nagai et al. | 137/884 |
| 6,305,228 B1 * | 10/2001 | Kimura et al. | 73/749 |
| 6,397,885 B1 * | 6/2002 | Golden et al. | 137/565.22 |
| 6,416,295 B1 * | 7/2002 | Nagai et al. | 417/190 |
| 6,715,400 B2 * | 4/2004 | Muth et al. | 91/54 |
| 6,719,536 B2 * | 4/2004 | Schmalz et al. | 417/187 |
| 6,729,852 B2 * | 5/2004 | Schnatterer | 417/189 |
| 6,851,936 B2 * | 2/2005 | Stingel et al. | 417/198 |
| 6,955,526 B2 * | 10/2005 | Yamazaki et al. | 417/187 |
| 7,140,389 B2 * | 11/2006 | Schnatterer et al. | 137/565.23 |
| 2005/0118032 A1 * | 6/2005 | Nagai et al. | 417/182 |

* cited by examiner

EJECTOR DEVICE WITH VENTILATION ACTION

TECHNICAL FIELD OF THE INVENTION

The invention relates to an ejector device that is driven by compressed air in order to generate a negative pressure useful in an industrial process. The invention relates in particular to ejector devices having suction grip means, such as suction cups, which are furnished with a function for active ventilation of the gripping member for the detachment of a gripped item.

BACKGROUND AND PRIOR ART

Ejector devices of this type comprise one or more ejectors containing one or more jets or nozzles arranged in sequence and through which an air flow is fed at high pressure. The compressed air is fed to the ejector via a compressed-air duct connected to a source of compressed air. The ejector is in flow communication with a space from where air is evacuated by suction into the flow of compressed air through the ejector via slits formed between the nozzles, or at the outlet of the individual jet. The evacuated space is, via an air suction duct, in flow communication with one or more gripping member, typically in the form of one or more suction cups.

The flow of compressed air to the ejector is adjustable by means of a valve arranged in the compressed-air duct and adapted to open and shut off the flow of compressed air, and, where appropriate, for partial restriction of the flow to the ejector. The valve may be associated with a control member that regulates the flow of compressed air in accordance with instructions in a working program, and/or in response to a detected negative pressure sensed by means of a pressure sensor that communicates with the air suction duct. In a maximally decentralized embodiment, each suction cup has one or more dedicated ejectors, valve units and control members.

In ejector devices of this type, it is previously known to arrange a function for active ventilation of the suction cup so as to enable detachment of the gripped object, thereby allowing short work cycles. Such ventilation functions usually comprise an electrically activated valve, which upon opening lets in atmospheric pressure or compressed air to the evacuated space under the suction cup.

SUMMARY OF INVENTION

In the present invention, an ejector device is provided having a further developed ventilation action, which has the purpose of reducing the energy consumption of the ejector device as well as aiming for a ventilation that is quick but still cautious to the gripped object.

The above objects are met in an ejector device disposed according to claim 1. Advantageous embodiments are defined in the dependent claims.

Briefly, the invention consist of an ejector device being furnished with a compressed-air-controlled vent valve through which atmospheric pressure can be fed into the gripping member in the open position of the vent valve. More precisely, the ejector device is disposed in such a way that a closing air pressure is applied to the vent valve independently of, if applicable, an intermittent driving of the ejector with the purpose of maintaining a predetermined negative pressure in the gripping member.

In one embodiment, the invention includes an ejector device that is adapted to generate a negative pressure by means of compressed air, which via a compressed-air duct is fed to an ejector included in the device, a valve member arranged in the compressed-air duct and controllable in order to, in the open position, allow flow of compressed air to the ejector, furthermore an air suction duct arranged between the ejector and a gripping member driven by negative pressure, as well as a vent valve that is arranged in flow communication with the air suction duct and that, in an open position, places the gripping member in communication with the atmosphere. The embodiment is characterized in that the valve member embraces a primary valve arranged in the direction of flow of the compressed air;

a secondary valve arranged in the direction of flow downstream of the primary valve;

a flow section of the compressed-air duct between the primary valve and the secondary valve, through which flow section compressed air flows in the open positions of the valves, the vent valve being in flow communication with said flow section in order to, in the open position of the primary valve, continuously being subjected to a closing air pressure, independently of the open or closed position of the secondary valve.

The primary valve is, upon closure, preferably adapted to place the vent valve in flow communication with the atmosphere via said flow section of the compressed-air duct.

Furthermore, the vent valve is biased against the open position thereof. For this purpose, the vent valve may, in an advantageous embodiment, embrace a resilient valve body, which in the closed position of the primary valve is brought to seal against a seat, which opens toward the air suction duct. In that connection, at atmospheric pressure in said flow section, the spring force of the valve body is determined to lift the valve body from the seat against the negative pressure in the air suction duct. The valve body may advantageously be made of a flexible material, and in this case have an inherent bias force directed from the seat. The valve body is preferably formed so that it is stable in shape at a unidirectionally applied pressure or a pressure difference of at least 1 bar, preferably up to at least 2 bar, while exhibiting a reversible bending deformation at a larger pressure difference.

The vent valve preferably comprises a valve body being circular in planar view and having a conical surface that is facing the seat and brought to seal against a corresponding conical end of a cylindrical mouth to a vent duct connected with the air suction duct. Radially outside said conical surface, the vent valve body may be formed with a ring-shaped section having a comparatively smaller thickness, the peripheral area of which is anchored in a housing of the ejector device.

At least one inlet duct that is open to the atmosphere may be arranged to open, with one end thereof, in the area of the cylindrical mouth of the vent duct, and via which the air suction duct is brought into flow communication with the atmosphere when the vent valve body lifts from the mouth of the vent duct. The inlet duct may alternatively embrace a plurality of discrete ducts that, as being evenly distributed around the vent duct, open on a level with the mouth of the vent duct. In another embodiment, the inlet duct may be ring-shaped and open concentrically around the mouth of the vent duct.

The secondary valve of the ejector device is preferably adapted to switch between the open and closed position depending on the current pressure in the air suction duct. On the other hand, the primary valve may be associated with a pilot valve that controls the switching of the primary valve between the open and closed position in response to a command from an integrated or external control member. The pilot valve may, for example, contain an electromagnet or a piezo-electric element.

Additional details and advantages of the invention are explained in the detailed description.

BRIEF DESCRIPTION OF THE DRAWINGS

The invention is described in more detail below, reference being made to the appended drawings, wherein.

DETAILED DESCRIPTION OF PREFERRED EMBODIMENTS

Figure 1:
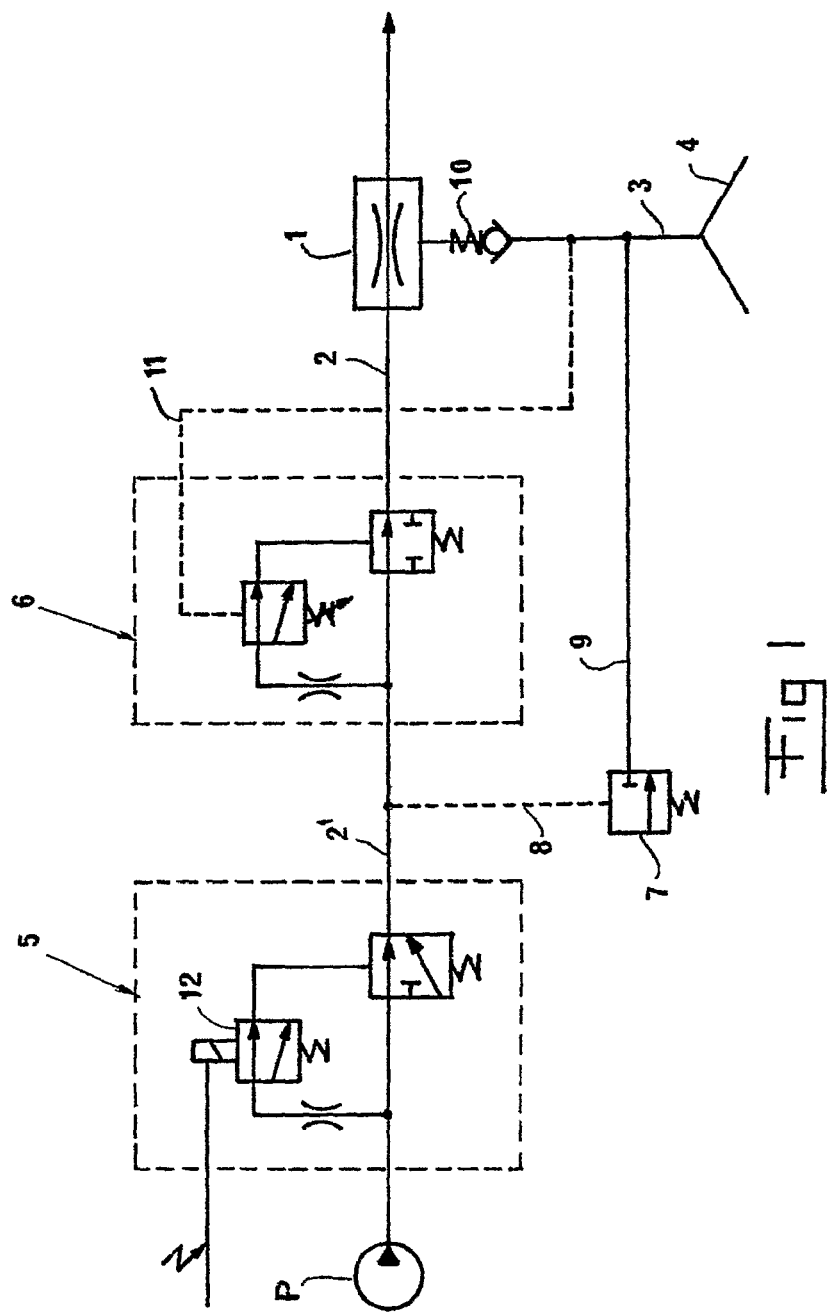
FIG. 1 is an electrical/pneumatical block diagram of an ejector device according to the invention.

With reference to FIG. 1, an ejector device according to the invention is shown in the form of a simplified electrical/pneumatical block diagram. In the diagram, the reference designation 1 indicates an ejector, which via a compressed-air duct 2 is driven by an external source of compressed air P in order to generate a negative pressure. The negative pressure is fed from the ejector via an air suction duct 3 to a gripping member, for instance to a suction cup 4. In the compressed-air duct, a valve member is arranged and controlled for the opening and shutting off, respectively, of the flow of compressed air to the ejector 1. The valve member comprises a primary valve 5 in the direction of flow of the compressed air and a secondary valve 6 arranged downstream of the same. In the open positions of the valves, the connection with the source of compressed air is opened for flow of compressed air through the ejector, via the compressed-air duct 2 a flow section 2' of which runs between the primary valve and the secondary valve. A vent valve 7 communicates, via a flow communication 8, with said flow section 2' and is, via the same, subjected to pressurized air in the open position of the primary valve, whereby the vent valve 7 is brought into the closed position shown in FIG. 1. The vent valve 7 is in turn in flow communication with the air suction duct 3 via a vent duct 9. Upon closure of the primary valve 5, said flow section of the compressed-air duct is opened to the atmosphere, with the result that the vent valve 7 opens to connect the air suction duct 3 to the atmosphere via the vent duct 9. The vent valve 7 is biased toward the open position. For the sake of completeness, it should be mentioned that a non-return valve 10 may be inserted in the air suction duct 3 to prevent return flow from the ejector when the ejector is shut off.

The secondary valve 6 is effective to maintain a desired negative pressure in the gripping member 4. The dashed line 11 in FIG. 1 illustrates that, for this purpose, the secondary valve 6 is adapted to switch between the open and closed position depending on the current pressure in the air suction duct 3. However, the switching of the secondary valve does not affect the vent valve 7, which via the flow section 2' of the compressed-air duct between the valves as well as via the flow communication 8 is subjected to a closing air pressure independently of the position of the secondary valve, as long as the primary valve 5 is in the open position.

The primary valve 5 is controlled on command for the opening and closure of the compressed-air duct 2. For the purpose, the primary valve 5 is associated with a pilot valve 12, which is controlled by control signals generated in an external or integrated control member.

Figure 2:
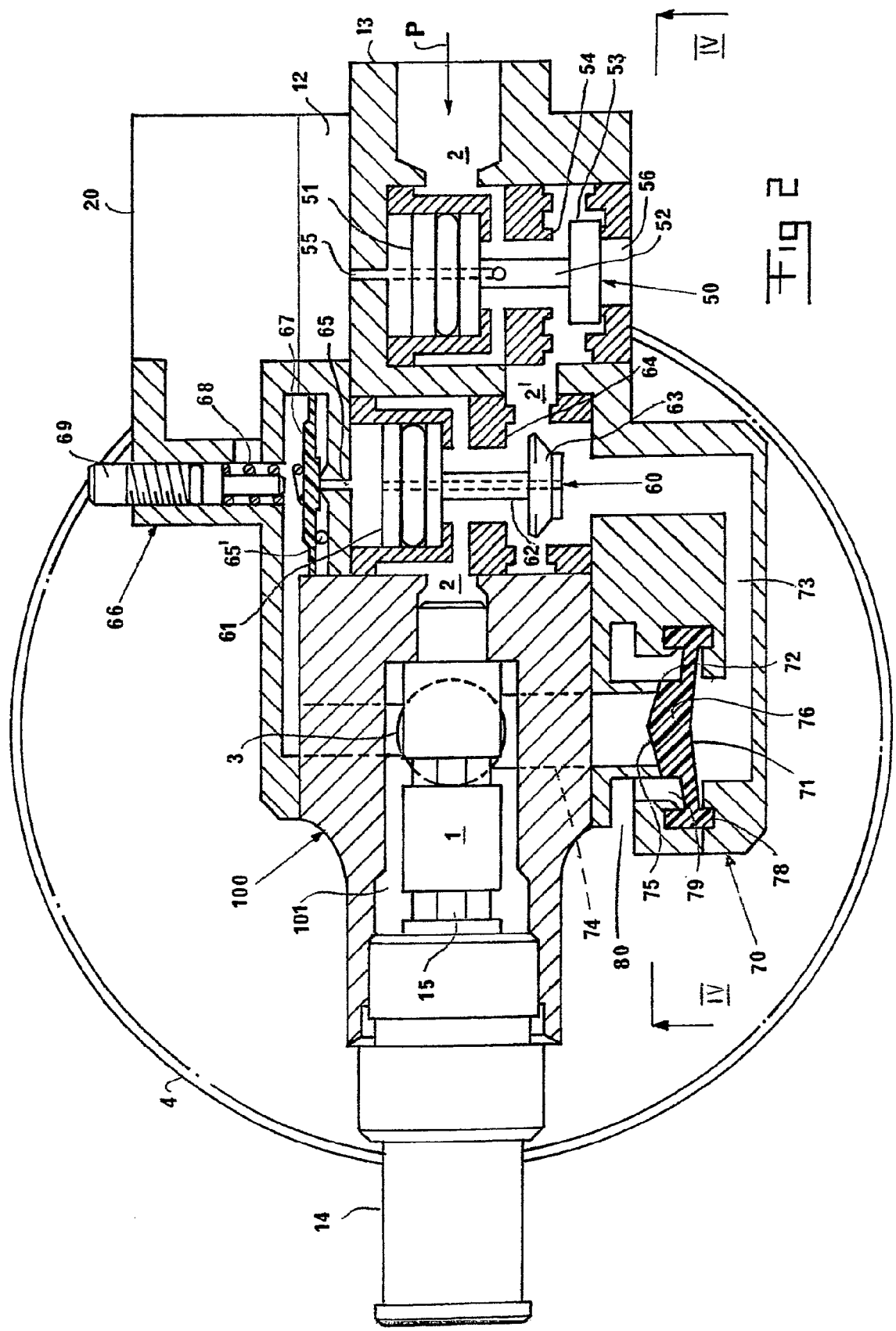
FIG. 2 is a schematically shown cross-section through an embodiment of an ejector device according to FIG. 1.

With reference to FIG. 2, the ejector device is shown realised in an embodiment of the invention. The ejector device in FIG. 2 comprises a housing 100, which is formed to support at least one ejector 1 and one or more gripping members, here in the form of a schematically illustrated individual suction cup 4. The housing 100 in the illustrated embodiment has an ejector seat 101 for an ejector mounted in the housing, but may alternatively be formed to carry an ejector coupled to the outside of the housing. The ejector 1 is fed with compressed air via the compressed-air duct 2, which opens at the outside of the housing with a connection 13 by which the ejector may be placed in flow communication with the external source of compressed air. The compressed air is fed out of the housing via the outlet of the ejector, if applicable through a sound absorber 14. The ejector 1 may be of a single-stage type or multi-stage type, comprising a single or a plurality of nozzles or jets arranged in sequence. The ejector 1 may advantageously consist of the illustrated multi-stage ejector having a rotationally symmetrical body, and with one or more openings 15 arranged in the shell thereof for evacuation of air from the seat 101. From the seat 101, the air suction duct 3 extends to the suction cup 4 (in FIG. 2 inward from the plane of the drawing) to supply the same with negative pressure. The housing 100 may be formed integrally or composed of a number of housing parts, and usually comprises means (not shown) for coupling of the housing to a movable carrying member, such as a robot arm or another movable machine part.

The flow of compressed air to the ejector 1 is controlled via a valve member, which as seen in the direction of flow p is arranged in the compressed-air duct upstream of the ejector. The valve member in the illustrated embodiment comprises a primary valve 50 in the direction of flow and a secondary valve 60 arranged downstream of the primary valve. The primary valve 50 comprises a piston 51, which in the end of a rod 52 supports a valve body 53, which upon opening of the primary valve is brought to lift from a seat 54. The primary valve opens for flow in the compressed-air duct 2 upon shut off of a limited leakage flow via the piston and via a leakage flow duct 55. The leakage flow is controlled by means of a pilot valve 12. Preferably, the pilot valve 12 is driven electrically on command from a control member 20 (not shown in detail) according to an internally or externally stored work scheme and/or in accordance with a continuous monitoring of the operation of the ejector device. The pilot valve 12 may comprise a conventional electromagnetic valve or a conventional piezo valve containing a piezo-electric element. Upon closure of the leakage flow duct 55, the pressure increases on the piston so that this is brought into the open position, shown in FIG. 2. In the open position of the primary valve, the valve body 53 closes an exhaust 56 from the primary valve.

The secondary valve 60 is in the way described below pressure-controlled in order to, during a work cycle, if required, intermittently feed compressed air to the ejector so as to enable maintenance of a predetermined and, if applicable, adjustable negative pressure. For the purpose, the secondary valve 60 comprises a piston 61, which in the end of a hollow rod 62 supports a valve body 63, which upon opening of the secondary valve is brought to lift from a seat 64. The secondary valve opens for flow in the compressed-air duct 2 upon shut off of a limited leakage flow via the valve rod, the piston and via a leakage flow duct 65. The leakage flow is controlled depending on the current pressure in the suction duct 3/the suction cup 4. For the purpose, the secondary valve is associated with a pressure control valve 66, containing a flexible, air-proof diaphragm 67. The diaphragm 67 is spring biased to a closing position and on the biased side thereof exposed to the pressure in the air suction duct 3, and on the opposite side, via the leakage flow duct 65, exposed to the pressure in the compressed-air duct 2. Upon achieved negative pressure in the air suction duct, the force of the bias spring 68 is overcome with the result that the diaphragm yields for the pressure in the compressed-air duct 2, and opens for leakage flow via the leakage flow duct 65 and via an outlet 65', whereby the valve body 63 is brought to seal against the seat 64. In the closed position, the flow of compressed air through the ejector 1 is interrupted. Upon a pressure increase in the air suction duct 3, above a predetermined negative pressure, the leakage flow duct 65 is closed with the result that the valve body 63 is brought into the open position, shown in FIG. 2. The bias force of the spring is suitably adjustable by means of an adjusting screw 69, accessible from the outside of the housing.

The embodiment in FIG. 2 is characterized by a high degree of integration of functions of an ejector device included in a decentralized vacuum system. In particular, the ejector device is characterized by a compressed-air-controlled vent valve 70 through which atmospheric pressure can be fed into the suction cup upon detachment of a gripped item. More precisely, the ejector device is disposed in such way that, during a work cycle, a closing air pressure is continuously applied to the vent valve independently of an intermittent driving of the ejector in order to maintain a predetermined negative pressure in the gripping member.

Figure 3:
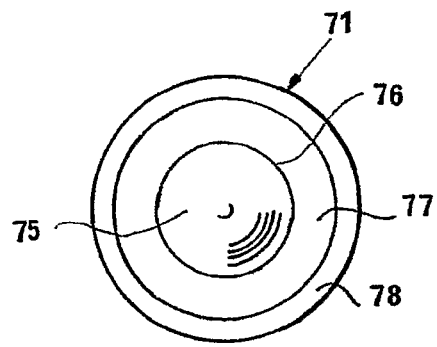
FIG. 3 is a planar view of a valve body included in the ejector device.
Figure 4:
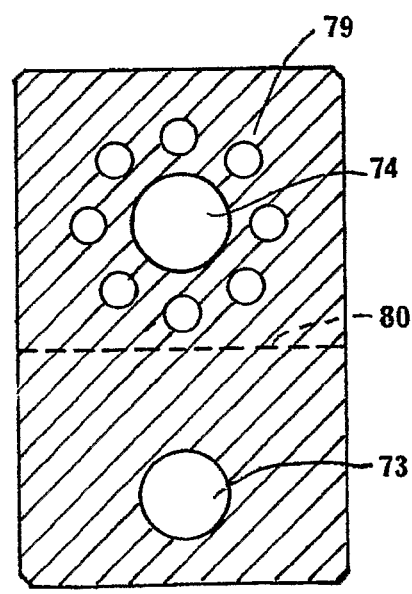
FIG. 4 is a cross-section in the plane IV-IV in FIG. 2, showing the valve seat of an embodiment of a vent valve included in the ejector device.

With reference also to FIGS. 3 and 4, a vent valve 70 is shown to comprise a valve body 71 and a valve seat 72. The valve body 71 is, via a flow duct 73, in flow communication with a flow section 2' of the compressed-air duct 2, and more precisely a flow section 2' that is delimited between the seat 54 of the primary valve and the seat 64 of the secondary valve. The valve seat 72 is formed in the mouth of a cylindrical vent duct 74, which is in flow communication with the air suction duct 3. In the cylindrical mouth of the vent duct, the valve seat 72 has a conical contact surface in correspondence with an opposite conical contact surface 75 formed on the valve body 71. The contact surface 75 of the valve body is arranged on a central protrusion 76 of a valve body being circular in planar view. Radially outside the conical contact surface 75, there is running a ring-shaped section 77 having a comparatively smaller thickness, the peripheral area 78 of which is anchored in the housing 100 of the ejector device, or in a part included in a composite housing 100.

The valve body 71 is biased into the open position. The valve body 71 is suitably manufactured from a flexible material having an inherent shape stability, which is dimensioned to resist a unidirectionally applied pressure or a pressure difference of at least 1 bar, preferably up to at least 2 bar. Upon a unidirectional application of a higher pressure via the flow duct 73, the valve body undergoes a reversible bending deformation so as to seal against the valve seat 72. The required sealing pressure is maintained continuously via the flow duct 73 when the primary valve 50 is in the open position thereof, independently of the open or closed position of the secondary valve 60. Upon closure of the primary valve, the valve body 71 is connected to the atmosphere via the exhaust 56 of the primary valve, whereby the valve body returns to the original shape thereof and the conical surface 75 lifts from the seat 72 of the vent duct 74.

The valve body 71 may be made of natural rubber, mixed rubber or a polymer material with or without reinforcement of organic material, metal or another inorganic material, in the form of fibres, strips, plates, which may be integrated in the material or applied on the outside of the valve body. Without showing this particularly, it is appreciated that the valve body of the vent valve may be adapted to co-operate with an adjustable biasing member substantially according to the same or a similar construction principle as has been shown above in association with the pressure control valve 66 of the secondary valve.

In the open position of the vent valve, the air suction duct 3 is connected to the atmosphere via the vent duct 74. For the purpose, the vent duct may be associated with at least one inlet duct 79 that is open to the atmosphere and runs parallel to the vent duct in order to, in one, inner end thereof, open in the area of the cylindrical mouth of the vent duct. Preferably, as is illustrated in FIG. 4, a number of inlet ducts 79 are concentrically evenly distributed around the vent duct 74 in order to, with the inner ends thereof, open on a level with the mouth of the vent duct, and with the opposite, outer ends thereof open in a common inlet 80. Alternatively, the inlet duct 79 may be ring-shaped and open concentrically around the mouth of the vent duct.

The above embodiment is described as an example of realization of the invention. Details in the embodiment may individually or in different combinations contribute in a meritorious way to the solution defined in the accompanying claims. It will also be appreciated that details in the embodiment may be modified without departing from the principle solution provided in the claim.

LIST OF DESIGNATIONS

1 Ejector
2 Compressed-air duct
2' Flow section included in the compressed-air duct
3 Air suction duct
4 Gripping member/suction cup
5 Primary valve
6 Secondary valve
7 Vent valve
8 Flow communication
9 Vent duct
10 Non-return valve
11 Pressure control line
12 Pilot valve
13 Compressed-air connection
14 Sound absorber
15 Opening
20 Control member
50 Primary valve
51 Piston
52 Rod
53 Valve body
54 Seat
55 Leakage flow duct
56 Exhaust
60 Secondary valve
61 Piston
62 Rod
63 Valve body
64 Seat
65, 65' Leakage flow ducts
66 Pressure control valve
67 Diaphragm
68 Spring 69 Adjusting screw
70 Vent valve
71 Vent valve body
72 Valve seat
73 Flow duct
74 Vent duct
75 Contact surface
76 Protrusion
77 Ring-shaped section
78 Peripheral area
79 Inlet duct
80 Inlet
100 Housing
101 Ejector seat

The invention claimed is:

1. An ejector device configured to generate a negative pressure by compressed air that is fed from an external source (P) of compressed air to an ejector (1) supported in the ejector device, the ejector device comprising:
 a valve assembly configured to control feeding of the compressed air to the ejector, the valve assembly comprising a primary valve (5; 50) arranged in a compressed-air duct (2, 2') and a secondary valve (6; 60) arranged in the compressed-air duct downstream of the primary valve, in the direction of flow of the compressed air from the external source (P) to the ejector;
 an air suction duct (3) by which negative pressure is fed from the ejector to a gripping member (4) driven by negative pressure;
 a ventilation duct (74, 79) that is open to atmospheric pressure;
 a vent valve (7; 70) arranged in the ventilation duct open to atmospheric pressure, the vent valve being biased towards an open state which provides air communication between the gripping member and atmospheric pressure via the air suction duct and the ventilation duct, the vent valve being configured, when in a closed state, to prevent communication between the gripping member and atmospheric pressure; and
 a flow duct (73) communicating air pressure from the compressed-air duct (2, 2') to the vent valve (7; 70);
 wherein the primary valve (5; 50) in open state sets the vent valve (7; 70) under pressure of compressed-air which closes the vent valve, and
 wherein the primary valve (5; 50) in closed state connects the vent valve (7; 70) with atmospheric pressure via an exhaust (56) from the primary valve to atmosphere.

2. The ejector device according to claim 1, wherein the vent valve comprises a resilient valve body (71) sealing against a seat (72) that opens toward the air suction duct (3), wherein, at atmospheric pressure in the compressed-air duct (2'), a spring force of the valve body (71) is determined such as to lift the valve body from the seat (72) against the negative pressure in the air suction duct (3).

3. The ejector device according to claim 2, wherein the valve body (71) is made of a flexible material and formed with an inherent bias force that presses the valve body to the open position.

4. The ejector device according to claim 3, wherein the valve body (71) is stable in shape at a unidirectionally applied pressure or a pressure difference of at least 1 bar while exhibiting a reversible bending deformation at a larger pressure difference.

5. The ejector device according to claim 2, wherein the vent valve (7; 70) comprises a valve body (71) being circular in planar view and having a conical surface (75) that is facing the seat (72) and brought to seal against a corresponding conical end of a cylindrical mouth (72) to a vent duct (74) connected with the air suction duct (3).

6. The ejector device according to claim 5, wherein the valve body (71), radially outside said conical surface, comprises a ring-shaped section (77) having a comparatively smaller material thickness, a peripheral area (78) of which is anchored in a housing of the ejector device, or in a part connected with said housing.

7. The ejector device according to claim 5, further comprising at least one inlet duct (79) that is open to the atmosphere and in one end thereof opens in an area of the cylindrical mouth (72) of the vent duct, and via which the air suction duct (3) is brought into flow communication with the atmosphere when the valve body (71) lifts from the mouth of the vent duct (74).

8. The ejector device according to claim 7, wherein the inlet duct (79) comprises a plurality of discrete ducts that, as being evenly distributed around the vent duct, open flush with the mouth of the vent duct (74).

9. The ejector device according to claim 7, wherein the inlet duct (79) is ring-shaped and opens concentrically around the mouth of the vent duct (74).

10. The ejector device according to claim 1, wherein the secondary valve (60) is adapted to switch between the open and closed position depending on a current pressure in the air suction duct (3).

11. The ejector device according to claim 1, wherein the primary valve (50) is associated with a pilot valve (12) that controls the switching of the primary valve between the open and closed position.

12. The ejector device according to claim 11, wherein the pilot valve contains a piezo-electric element.

* * * * *